(12) United States Patent
Seminel et al.

(10) Patent No.: US 10,598,265 B2
(45) Date of Patent: Mar. 24, 2020

(54) ACTUATOR ASSEMBLY

(71) Applicant: Ratier-Figeac SAS, Figeac (FR)

(72) Inventors: Bruno Seminel, Lissac-et-Mouret (FR); Frédéric Vermande, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 22 days.

(21) Appl. No.: 15/659,693

(22) Filed: Jul. 26, 2017

(65) Prior Publication Data

US 2018/0031093 A1 Feb. 1, 2018

(30) Foreign Application Priority Data

Jul. 27, 2016 (EP) .................................... 16305968

(51) Int. Cl.
*B64D 45/00* (2006.01)
*F16H 25/20* (2006.01)
(Continued)

(52) U.S. Cl.
CPC ....... *F16H 25/2021* (2013.01); *B64C 13/341* (2018.01); *F16H 25/2015* (2013.01); *F16H 25/2454* (2013.01); *F16H 57/01* (2013.01); *F16H 57/025* (2013.01); *G01L 1/26* (2013.01); *G01L 5/0061* (2013.01); *G07C 5/0808* (2013.01); *G07C 5/0816* (2013.01); *B64D 2045/0085* (2013.01); *F16H 2025/2037* (2013.01); *F16H 2025/2081* (2013.01); *F16H 2057/012* (2013.01)

(58) Field of Classification Search
CPC .... F16H 57/025; F16H 57/01; F16H 25/2021; F16H 2025/2037; B64C 5/10; B64C 13/28

USPC ................................ 244/99.3, 99.9; 74/89.37
See application file for complete search history.

(56) References Cited

U.S. PATENT DOCUMENTS 2,844,048 A * 7/1958 Bennett .................... F16H 35/10
192/150
3,284,103 A * 11/1966 Polzin .................... F16B 7/1472
403/72

(Continued)

FOREIGN PATENT DOCUMENTS

EP 1557588 A1 7/2005
EP 1972549 A1 9/2008
(Continued)

OTHER PUBLICATIONS

European Search Report for ApplicationNo. 16305968.6-1762, dated Feb. 10, 2017, 8 Pages.

*Primary Examiner* — Jake Cook
*Assistant Examiner* — Gregory Robert Weber
(74) *Attorney, Agent, or Firm* — Cantor Colburn LLP

(57) ABSTRACT

An actuator assembly may comprise a screw shaft having a shaft axis; a drive arrangement pivotally supported about the screw shaft axis for driving the screw shaft, e.g., about the shaft axis or along the shaft axis, and a rod mounted to the drive arrangement at a location off the shaft axis for providing a primary function of reacting torque about the shaft axis on the drive arrangement. The rod may comprise a rod axis and provide a load path along the rod axis for reacting torque. The rod may also comprise a device for which provides a secondary function for the actuator assembly based on the load experienced along the load path provided by the rod.

10 Claims, 9 Drawing Sheets

(51) Int. Cl.
*F16H 25/24* (2006.01)
*F16H 57/025* (2012.01)
*F16H 57/01* (2012.01)
*B64C 13/28* (2006.01)
*G01L 5/00* (2006.01)
*G01L 1/26* (2006.01)
*G07C 5/08* (2006.01)

(56) References Cited

U.S. PATENT DOCUMENTS

| | | | | |
|---|---|---|---|---|
| 7,680,630 | B2* | 3/2010 | Schmidt | G01D 9/005 |
| | | | | 702/189 |
| 8,336,818 | B2* | 12/2012 | Flatt | B64C 13/28 |
| | | | | 244/99.2 |
| 8,918,291 | B2* | 12/2014 | Tallot | B64C 5/10 |
| | | | | 702/34 |
| 8,960,031 | B2* | 2/2015 | Keech | B64C 5/02 |
| | | | | 244/99.3 |
| 9,394,980 | B2* | 7/2016 | Jones | F16H 25/2454 |
| 9,459,168 | B2* | 10/2016 | Kohuth | G01L 5/0028 |
| 9,528,469 | B2* | 12/2016 | Somerfield | F02K 1/763 |
| 9,950,782 | B2* | 4/2018 | Huynh | B64C 9/00 |
| 10,132,333 | B2* | 11/2018 | Atkins | F15B 15/103 |
| 2011/0127375 | A1 | 6/2011 | Tallot et al. | |
| 2013/0001357 | A1 | 1/2013 | Cyrot | |
| 2017/0335931 | A1* | 11/2017 | Moulon | B64C 13/28 |

FOREIGN PATENT DOCUMENTS

| | | | | |
|---|---|---|---|---|
| EP | 2716935 | A1* | 4/2014 | F16H 25/2472 |
| WO | 2014153518 | | 9/2014 | |

* cited by examiner

ACTUATOR ASSEMBLY

FOREIGN PRIORITY

This application claims priority to European Patent Application No. 16305968.6 filed Jul. 27, 2016, the entire contents of which is incorporated herein by reference.

FIELD

The present disclosure relates to an actuator assembly. It also relates to a method of reacting torque on a drive arrangement of an actuator assembly. It further relates to protecting an actuator assembly from angular impulses.

The actuator assembly may be for controlling aspects of an aircraft. By way of example, it may be a flight control actuator, such as a Trimmable Horizontal Stabilizer Actuator (THSA).

BACKGROUND

Actuator assemblies are commonly used in aircraft. A screw actuator, for example, may be connected to an airframe at a motor end, e.g., by a spherical bearing or clevis bearing, and by a gimbal arrangement installed on a ballscrew nut of the actuator. The assembly may include a rod, which can act in tension or compression, that extends between a motor/gearbox housing and a portion of the airframe. The rod reacts torque experienced by the motor/gearbox during operation of the screw shaft. The nut on the screw shaft may be connected to a movable element, such as a flap or stabilizer, in particular a horizontal stabilizer. The stabilizer may be mounted to the airframe such that movement of the nut along the screw shaft operates the stabilizer.

No-back devices are commonly used in screw actuators like this to prevent feedback forces generated by loading the nut of the actuator, from feeding back into the actuator's motor. When a nut of a screw actuator is loaded by an external force (i.e. forces other than that from motor driving the screw shaft, such as forces created through air flow on a stabilizer) the interaction of the nut with the screw shaft will tend to rotate the screw shaft, as the nut tries to translate along the screw shaft in the direction of the external force. A no-back device may be provided on the screw shaft to prevent or at least minimise rotation of the screw shaft induced in this manner.

When external forces are applied to a nut, the nut will experience a force along the screw shaft, either towards the motor or away from the motor. The handedness of the screw shaft thread will determine whether a force towards the motor induces a clockwise or an anticlockwise torque. No-back devices commonly make use of this fact by providing two braking mechanisms—one braking mechanism will provide, say, clockwise braking forces when the screw shaft is loaded towards the motor/gearbox, and the other braking mechanism will provide anticlockwise braking forces when the shaft is pulled away from the motor by feedback forces. The braking forces that the no-back device can provide are aimed to be sufficient to counteract the maximum feedback torque applied to the screw shaft by the nut. However, no-back devices can fail, either gradually or suddenly.

There is a desire to be able to monitor the health of a no-back device. U.S. Pat. No. 8,918,291 B2, for example, discloses a method and system for monitoring an actuator equipped with a no-back device. The examples disclosed therein involve monitoring of the inputs and outputs of the motor (e.g. voltages for an electric motor or pressures for a hydraulic motor) in conjunction with rotary sensors on the output shaft to determine dysfunction of the no-back device.

It would also be desirable to improve the functionality of the actuator assembly through adaptions that do not affect the primary role of the components.

SUMMARY

According to a first aspect, the disclosure provides an actuator assembly comprising:

a screw shaft having a shaft axis; a drive arrangement pivotally supported about the screw shaft axis for driving the screw shaft; and a rod mounted to the drive arrangement at a location off the shaft axis for providing a primary function of reacting torque about the shaft axis on the drive arrangement, the rod having a rod axis and being arranged to provide a load path that experiences load in a direction along the rod axis in reaction to torque on the drive arrangement, wherein the rod comprises a device which provides a secondary function for the actuator assembly based on the load experienced along the rod load path.

In one arrangement the screw shaft may be rotatable about the shaft axis and the screw shaft may be driven about the shaft axis by the drive arrangement, i.e., the drive from the drive arrangement is a rotational movement about the shaft axis, with one end of the screw shaft being rotatably connected to an airframe and the other end free. The rotational drive may in turn cause a nut coupled to a flight surface to translate along the screw shaft, actuating the flight surface.

In another arrangement the screw shaft may be rotationally fixed about the shaft axis but be displaceable along the shaft axis, i.e., the drive from the drive arrangement is a translational movement along the shaft axis. In this arrangement the screw shaft may be driven in a longitudinal direction along the shaft axis by the drive arrangement turning a nut on the screw shaft which is positionally fixed in the axial direction. One end of the screw shaft may then be coupled to a flight surface so that drive translates the end of the screw shaft, actuating the flight surface.

In both arrangements the drive arrangement of the actuator assembly is pivotally supported about the screw shaft axis, in the sense that the drive arrangement is free to rotate, at least to a limited degree, about the axis of the screw shaft—in other words it is free to "float" about the screw shaft axis in response to torque subject to the constraint imposed by the torque reaction rod.

The load may be a force acting in tension or compression along the rod load path, parallel to the rod axis.

The secondary function provided for the actuator assembly by the device might be a protective function. The device may be for protecting the actuator assembly.

The device, for example, might comprise a resilient mechanism, for example, a spring arrangement, that can reduce impulse on the actuator assembly resulting from sudden changes in torque on the drive arrangement.

In one example, the device may comprise a load limiter. The load limiter may comprise a spring arrangement which activates to limit axial forces in the rod.

The load limiter may be configured to control a change in length of the rod through axial movement of one portion relative to another, e.g., telescopic movement, when a load along the rod load path exceeds a pre-load of the load limiter (a tensile pre-load and/or a compressive pre-load). The change in length may be a shortening of the rod in response to compression, and/or a lengthening of the rod in response to tension. The load limiter may apply a biasing force against further compaction and/or elongation of the rod when the pre-load is exceeded.

The device may be for absorbing shock in the actuator assembly. It may provide a shock absorber for the actuator assembly. It may replace other shock absorbing components of an actuator assembly, e.g. resilient, shock absorbing end stops. Relative movement of a nut along the screw shaft may be limited by hard end stops.

Thus, the device may be for reducing rotational impulse in the drive arrangement about the shaft axis.

The device may be for detecting a performance of the actuator assembly based on load experienced along the rod load path reacting torque on the drive arrangement.

A performance may be an event during use of the actuator assembly. For example, it may be a hard stop during the operation of the actuator assembly, e.g., an abrupt stop of a nut part way along the screw shaft or, more usually, an abrupt stop at an end of the screw shaft when an end stop is reached.

The device may comprise a load limiter which is provided with an activation sensor for detecting a change of length of the rod.

The activation sensor may be a switch abutting or otherwise associated with a target that is configured to actuate in response to movement of the target relative to the switch. It may be a distance sensor configured to measure a distance between two points of the rod. The activation sensor may be a LVDT sensor or a potentiometer for example.

A performance may also be an operation of the actuator assembly during use. For example, it may indicate a deterioration or dysfunction in a component of the actuator assembly. It may indicate a failure in a component of the actuator assembly.

The device may comprise a load sensor for detecting at least a direction of the load along the rod load path. The direction of the load may be representative of the direction of the torque on the drive arrangement. For example, a positive load may indicate torque in one direction about the shaft axis and a negative load may indicate torque in the other direction.

The load sensor may also detect a magnitude of the load. It may monitor the loads with respect to time, e.g., to detect accelerations/decelerations on components of the actuator assembly, load cycle information, etc.

The load sensor may be arranged to transmit load signals to a processor which is programmed with an algorithm to compute parameters comprising a fatigue life consumption and/or endurance life consumption of one or more components of the actuator assembly.

The actuator assembly may comprise a movement sensor, to generate a movement signal which can indicate a direction of rotation of the screw shaft. The movement signal may be, for example, a rotation sensor configured to sense at least a direction of rotation of the screw shaft (or a nut in an arrangement where a nut is being rotated to drive the screw shaft in an axial direction).

The movement sensor may sense rotation of the screw shaft directly, e.g., through measuring angular movement of the screw shaft. Alternatively, it may sense rotation indirectly, for example, through rotation of a connected component such as a component of a motor or gearbox mechanically coupled to the screw shaft, or through change in position of a component, e.g., a position sensor measuring change in position of a nut on the screw shaft or a speed sensor measuring the rate of change. Similarly in an arrangement where a nut is being rotated and a screw shaft is translating, the movement sensor may sense rotation of the nut directly or indirectly.

The actuator assembly may, instead or in addition to, receive a signal from a movement sensor (e.g., rotation or other sensor) which is separate from the actuator assembly (but associated with it). It may be an existing sensor. The movement sensor may be installed on the actuator assembly or may be installed between fixed and/or movable surfaces of an aircraft.

The actuator assembly may comprise a processor (which may be the same processor as described above) configured to receive a movement signal indicating a direction of drive of the screw shaft from a movement sensor and to receive a direction of load signal from the load sensor. The processor may be configured to determine, from the direction of load signal and the movement signal, whether or not the actuator assembly is operating in a resistive load quadrant or load driven quadrant. For example, it may determine whether a direction of rotation of the screw shaft is in the same direction as a direction of torque applied to the screw shaft by the drive arrangement, or whether a direction of rotation of a nut on the screw shaft is in the same direction as a direction of torque applied to the nut by the drive arrangement.

The processor may be configured to: output a performance signal indicating whether the actuator assembly is operating in a load driven quadrant. For example, the processor may be configured to: output a performance signal indicating whether the direction of torque applied to the screw shaft by the drive arrangement is in the same direction as a direction of rotation of the screw shaft or is in an opposite direction to a direction of rotation of the screw shaft. Alternatively, the processor may be configured to: output a performance signal indicating whether the direction of torque applied on a nut by the drive arrangement is in the same direction as a direction of rotation of the nut or is in an opposite direction of rotation of the nut. A performance signal, for example, a warning signal, may be outputted if the actuator assembly is determined to be operating in a load driven quadrant, e.g., if a direction of torque is in an opposite direction to a driven direction of rotation of the screw shaft or nut.

Thus, the processor may be configured to determine whether the motor of the actuator assembly is operating in a resistive load quadrant or a load driven quadrant of an angular load to angular speed representation.

The processor may be configured to quantify a relationship of direction of torque to a direction of rotation of the screw shaft and/or nut, e.g., to assess a degree of excursion into a load driven quadrant for the actuator assembly. The processor may be configured to provide an indication of the health of the actuator assembly, e.g., a performance signal.

The processor may be configured to continuously monitor the direction of torque relative to direction of drive of the screw shaft, for example, through detecting speed of a motor driving the screw shaft and comparing it to a load signal from a load sensor provided on the rod.

The processor may be a component of the actuator itself or may be part of a monitoring circuit connected with it (e.g., on an aircraft flight control computer or an aircraft maintenance computer).

The actuator assembly may comprise a no-back device.

The no-back device may be connected with a rotational coupling, e.g., a spherical bearing, to a frame. Such a spherical bearing may block translational movement in three dimensions but permit rotational movement in three dimensions, at least within a limited stroke. The drive arrangement may be pivotally supported about the screw shaft axis via bearings permitting the drive arrangement to rotate about the screw shaft and about the no-back device.

The actuator assembly may comprise a gimbal for reacting torque which is coupled to the no-back device. Alternatively it may comprise a second rod for reacting torque which is coupled to the no-back device. The gimbal or second rod may be provided to react torque on the no-back device into a frame.

The second rod may be provided with a device which provides a secondary function for the actuator assembly based on load experienced along the second rod.

The secondary function of the device in the second rod may be any of the secondary functions mentioned herein.

The device in the second rod may comprise a resilient mechanism and may provide a protective function for the actuator assembly.

The device in the second rod may comprise a load sensor and the signal from the load sensor may be used in the monitoring of the actuator assembly.

According to a second aspect, the disclosure provides a method of reacting torque on an actuator assembly, wherein the actuator assembly comprises a screw shaft having a shaft axis, a drive arrangement pivotally supported about the screw shaft axis for driving the screw shaft, and a rod for connection to a frame, wherein one end of the rod is connected to the drive arrangement at a location off the shaft axis, the rod having a rod axis along which load is experienced resulting from torque on the drive arrangement; the method comprising: using the rod to provide a load path which can react torque on the drive arrangement as a primary function of the rod; and using the rod load path to operate a device which is part of the rod in order to provide a secondary function for the actuator assembly based on the load experienced along the rod load path.

The screw shaft may be rotatable about the shaft axis and the driving the screw shaft may comprise rotating the screw shaft about the shaft axis, e.g., to cause translation of a nut along the shaft axis.

Alternatively, the screw shaft may be translatable along the shaft axis and the driving the screw shaft may comprise translating the screw shaft along the shaft axis, e.g., through rotating a nut on the screw shaft to cause translation of the screw shaft.

Again, the load may be a force which is acting in tension or compression along the rod load path, parallel to the rod axis.

The device may be providing a secondary function which is a protective function for the actuator assembly by reducing angular impulses on the actuating assembly. For example, the device may comprise portions that move with respect to each other against a bias. In this way, the device may provide a degree of resiliency to the rod load path. The resiliency may be provided by one or more springs in the device. Resiliency in the rod load path may only activate once a threshold load or preload has been exceeded. The resiliency provided in the rod load path may reduce the impulse resulting from sudden changes in torque on the drive arrangement.

In one example, the method may comprise providing a rod with a device comprising a load limiter. The load limiter may comprise a spring arrangement having one portion which moves axially relative to another portion, for example, telescopes with respect to the other portion, in response to load, once a pre-load has been exceeded. The load limiter may be set so that when a pre-load is exceeded (under tensile and/or compressive load), a biasing force is applied against further compaction and/or elongation of the rod to limit axial forces in the rod.

Thus, additionally, from a third aspect, there may be provided a method of protecting an actuator assembly from angular impulses resulting from sudden changes in torque on a drive arrangement of an actuator assembly, the actuator assembly comprising a screw shaft having a shaft axis and a drive arrangement pivotally supported about the screw shaft axis for driving the screw shaft, the actuator assembly further comprising a rod which is connected at one end to the drive arrangement at a location off the shaft axis and at the other to a frame for reacting torque on the actuator assembly, the rod providing a load path along which load is experienced from torque on the drive arrangement, the method comprising providing a resilient mechanism in the rod load path to protect the actuator assembly from angular impulses. The resilient mechanism may comprise a spring arrangement. The resilient mechanism may comprise a load limiter, e.g., as described above, which is part of the rod.

The method of reacting torque described in the second aspect may include a secondary function of detecting a performance of the actuator assembly based on load experienced along the rod load path in reaction to torque on the drive arrangement.

In the method, the detecting a performance may comprise: detecting at least a direction of the load along the rod load path using a load sensor which is provided in the rod load path. It may comprise detecting a direction and magnitude of the load along the rod load path using the load sensor.

Thus the rod may comprise a load sensor and the load signals from the load sensor may be used to compute parameters such as a fatigue life consumption and/or endurance life consumption of one or more components of the actuator assembly. The load signals may be used to monitor the health of the actuator assembly, e.g., on a continuous basis or at intervals.

Thus the method of reacting torque may also comprise a method of monitoring the health of the actuator assembly.

The computation of the parameters may be performed in a processor in the actuator assembly and a fatigue life consumption and/or an endurance life consumption may be displayed on the actuator assembly or be readable from it, e.g., during routine maintenance.

Alternatively, the load signals from the load sensor might be fed to a flight control computer or aircraft maintenance computer for determination of a fatigue life consumption and/or an endurance life consumption of one or more components of the actuator assembly.

The load signals may include a time or a sequence code. The load signals may be stored on a storage device for later analysis.

The detecting a performance of an actuator assembly may comprise sensing a direction of drive of the screw shaft; processing information concerning the direction of the load and the direction of drive to determine a first performance status of the actuator assembly when the drive arrangement is operating in a resistive load quadrant and to determine a second performance status of the actuator assembly when the drive arrangement is operating in a load driven quadrant. For example, it may determine a first performance status when a direction of torque is in the same direction as the driven direction of rotation of the screw shaft and to determine a second performance status of the actuator assembly when a direction of torque is in an opposite direction to the driven direction of rotation of the screw shaft. Alternatively, it may determine a first performance status when a direction of torque is in the same direction as the driven direction of rotation of a nut and to determine a second performance status of the actuator assembly when a direction of torque is in an opposite direction to the driven direction of rotation of the nut.

The sensing a direction of drive may comprise receiving a movement signal, for example, a direction of rotation signal, from a movement sensor on the actuator assembly, which may detect rotation of the screw shaft and/or nut directly, or indirectly through rotation of a component in the drive arrangement mechanically coupled to the screw shaft and/or nut, for example a speed sensor on a motor, or from a sensor associated with the actuator assembly.

The method may comprise providing a resilient mechanism in a second rod which reacts torque in a no-back device of the actuator assembly. The resilient mechanism may act to limit load on the no-back device.

The method may comprise receiving load signals from a load sensor in a second rod which reacts torque on a no-back device of the actuator assembly. These load signals may be used with load signals from a load sensor in the rod for the drive arrangement to monitor the condition of the actuator assembly.

The detecting a performance of an actuator assembly may comprise controlling a change in a length of the rod through compaction or stretching of a resilient mechanism (for example, a load limiter) when a load along the rod load path exceeds a pre-load of the resilient mechanism; biasing the rod when the pre-load is exceeded in either tension or compression to return it back to an initial length; and detecting activation of the resilient mechanism through the change of length of the rod.

The detecting a performance of an actuator assembly may comprise determining if there has been a hard stop, for example, if the nut of the actuator has impacted an end stop of the screw shaft, when the resilient mechanism, for example, a load limiter, is activated.

According to a fourth aspect, the disclosure provides an actuator assembly torque reaction rod, the rod having a rod axis and a primary function of providing a load path for load experienced in reaction to torque from an actuator assembly, the rod further comprising a device to perform a secondary function for an actuator arrangement based on load experienced along the rod load path. The rod may comprise any device as described herein to provide the secondary function.

The rod may be a drive arrangement torque reaction rod for reacting torque into a frame of an aircraft. The rod may be a no-back device torque reaction rod for reacting torque into a frame of an aircraft.

BRIEF DESCRIPTION OF THE FIGURES

Certain embodiments of the present disclosure will now be described in greater detail by way of example only and with reference to the accompanying drawings in which.

DETAILED DESCRIPTION

Figure 1:
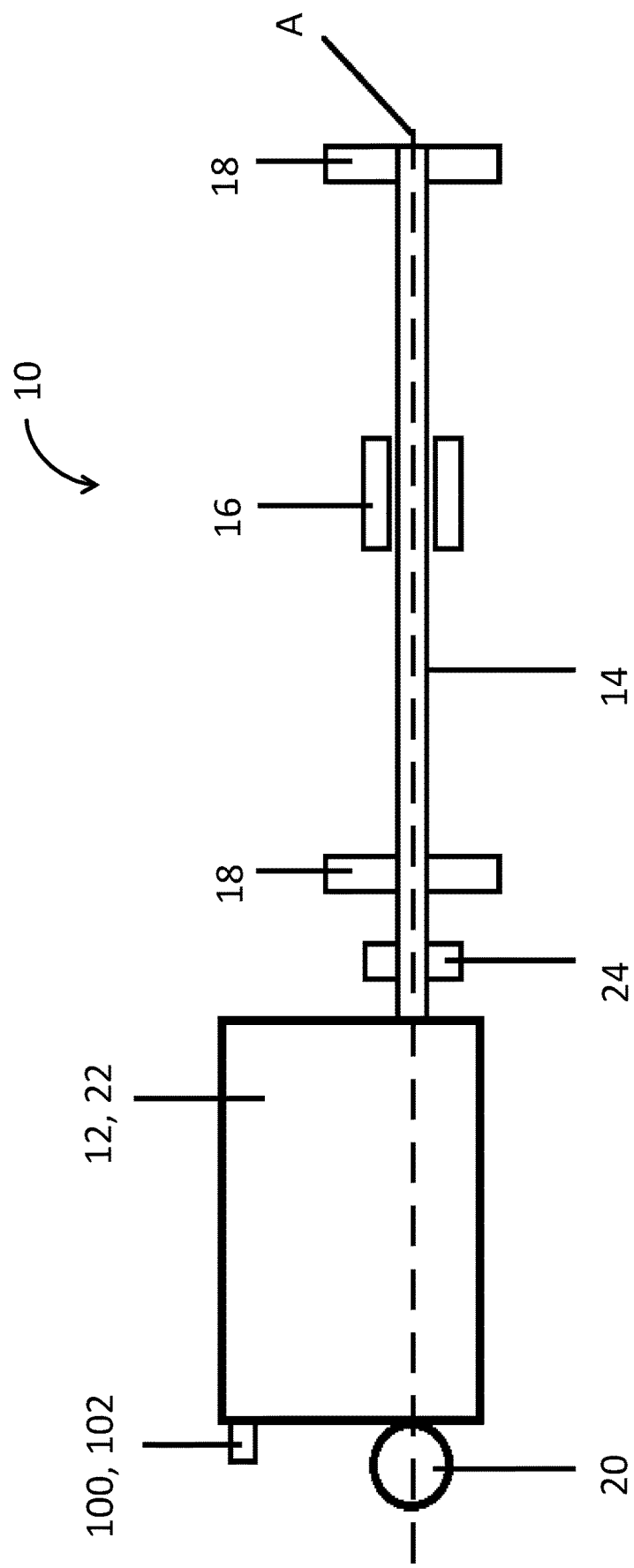
FIG. 1 shows a schematic side view of an exemplary screw actuator assembly.

FIG. 1 shows a schematic side view of an exemplary actuator assembly 10. The screw shaft 14 may have an axis A along which the nut 16 may move in either direction depending upon the output of the motor and the function of any no-back device. The nut 16 may be coupled to a moveable flight control surface (not shown), such that displacement of the nut 16 along the screw shaft 14 causes displacement or pivoting of the flight control surface.

The actuator assembly 10 may have a drive arrangement 12 at one end associated with a no-back device 22. The drive arrangement 12 may comprise a motor. It may also comprise a gearbox. The motor/gearbox may be integrated together to provide the drive arrangement 12 (for example, they may share a common housing, as indicated by the box shape 12 in the figure).

The drive arrangement 12 may comprise more than one motor/gearbox to provide redundancy.

The motor, or motors, as appropriate, may be an electric motor, a hydraulic motor, or any other kind of motor.

The no-back device 22 may be mounted to the screw shaft 14 or to a drive shaft of the motor that drives the screw shaft 14. In one exemplary arrangement, the no-back device 22 is provided at one end of the screw shaft 14, axially aligned with the screw shaft 14, and the drive arrangement 12 comprising the at least one motor/gearbox is supported on the screw shaft 14 for driving the screw shaft 14 about the screw shaft axis A, through the at least one motor being arranged to turn at least one gear which in turn drives the screw shaft 14. The motor/gearbox of the drive arrangement 12 may be arranged within a housing that is provided with bearings to rotate about the screw shaft 14 and the no-back device. The bearings may comprise plain, ball, roller, or thrust type bearings, for example. In this way the drive arrangement 12 may be arranged to "float" around the screw shaft axis A and the no-back device 22 with its movement controlled via one or more torque reaction devices (to be described in more detail below, e.g., in relation to FIG. 7) independently of the reaction of the torque on the motor/gearbox housing via the first reaction rod 100.

The nut 16 of the actuator assembly 10 may connect to a device to be moved. As one non-limiting example, the nut 16 may be attached to a Trimmable Horizontal Stabilizer of an aircraft. In this case, the actuator may be considered to be a Trimmable Horizontal Stabilizer Actuator (THSA). A Trimmable Horizontal Stabilizer may be subjected to aerodynamic loads from an airstream passing the aircraft. These aerodynamic loads on the Trimmable Horizontal Stabilizer may feed back into the actuator assembly 10 via the nut 16 and may seek to move the nut along the screw shaft axis A.

A no-back device may be used to prevent or at least minimize such motion of the nut and Trimmable Horizontal Stabilizer. The actuator assembly 10 may also be used with other control surfaces of an aircraft, such as flaps, slats, spoilers etc.

If feedback forces are applied to the nut 16 along the axis A of the screw shaft 14, then the force of the nut 16 against the screw shaft thread will act to turn the screw shaft 14 in order to allow translation of the nut along the shaft. The handedness of the screw shaft thread will determine whether the forces from the nut directed towards the motor induces a clockwise or an anticlockwise torque in the screw shaft 14. If, for example, the screw shaft 14 has a left-handed screw thread, then a force from the nut 16 towards the drive arrangement 12 will induce a clockwise torque (viewed from the nut 16 towards the drive arrangement 12), and a force from the nut 16 away from the drive arrangement 12 will induce an anticlockwise torque in the screw shaft 14.

The following description will be made with reference to a left-handed screw thread on the screw shaft 14. However, it is to be understood that the following disclosure is applicable to right-handed screw threads, changing the terms clockwise/anticlockwise as applicable.

When nut 16 is loaded by an external force along axis A, the linear force on the nut 16 may be converted into both a linear force on the screw shaft 14 and a torque on the screw shaft 14. In an actuator assembly 10 having a no-back device 22, this torque and/or axial load on the screw shaft 14 may be reacted by the no-back device 22 in order to prevent the torque from rotating the screw shaft 14. Alternatively, other devices known in the art may be used to react the axial load. A resistive torque provided by a no-back device 22 may generally balance the torque on the screw shaft 14 with margin.

When the no-back device 22 reacts torque from the screw shaft 14, the torque will act to turn the no-back device 22 about axis A. The no-back device 22 may be attached to the drive arrangement 12, and the torque feeding back through the screw shaft 14 may urge the drive arrangement 12 to rotate about the screw shaft 14.

Figure 5:
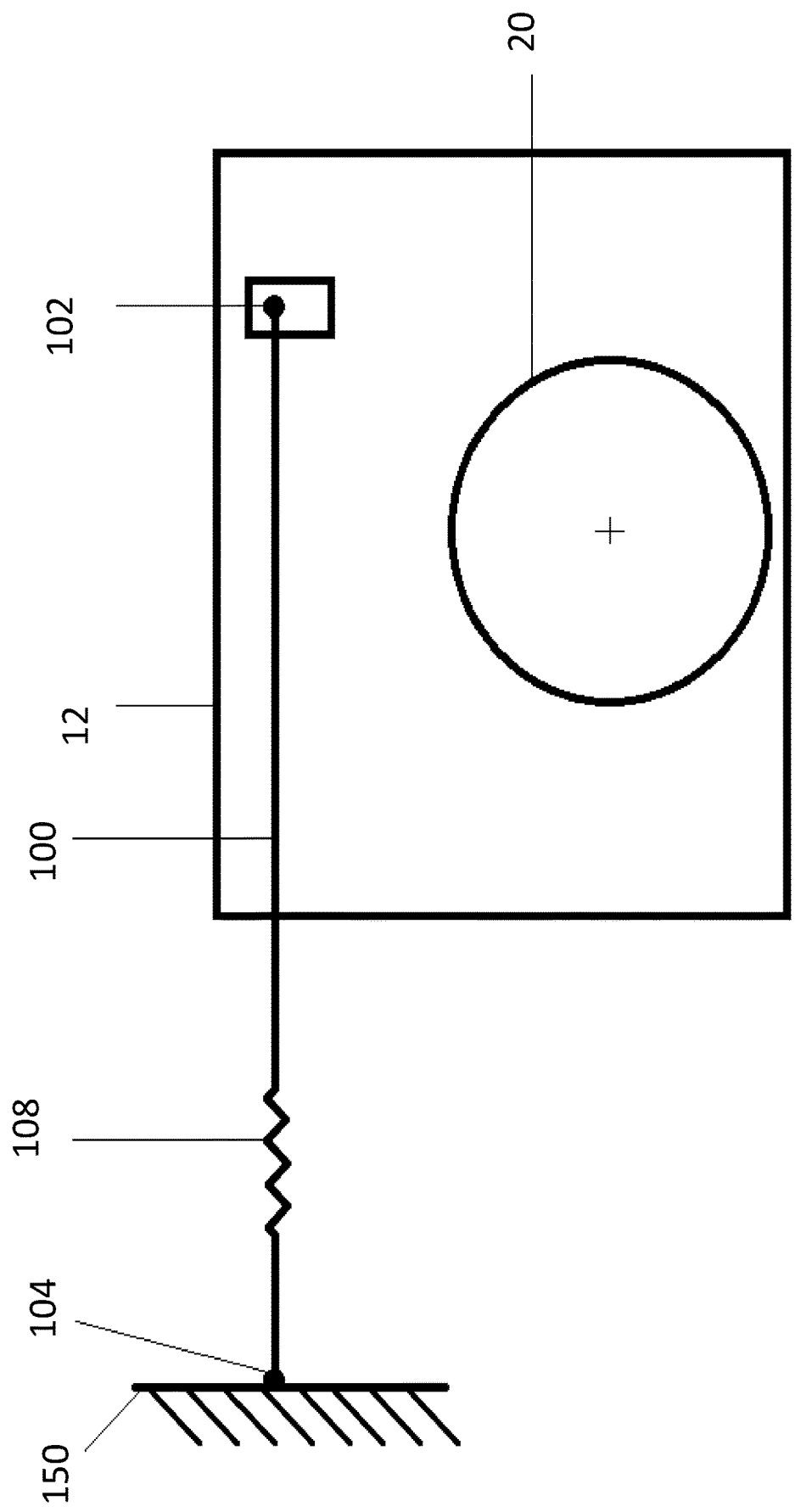
FIG. 5 shows a rear view of the exemplary actuator assembly of FIG. 1.

As shown in FIG. 5, which is an end-on view of the assembly shown in FIG. 1, a rod 100 may be connected to the drive arrangement 12 at a point 102 off the axis A of the screw shaft to counter torque on the drive arrangement 12. The rod 100 may be skew to the screw shaft axis A and may extend substantially tangentially to the torque axis (screw shaft axis A) so that it reacts torque in tension or compression. The torque in the drive arrangement 12 may then be reacted, via the rod 100, into a frame 150 to which the actuator assembly 10 is mounted. As one non-limiting example, the frame 150 may be an airframe.

In the event that feedback torque is not fully reacted by the no-back device 22, then the torque may reach a drive shaft of the motor. This may happen, for example, if the no-back device 22 is worn or has failed, or if the feedback forces are beyond the design-tolerance of the no-back device 22.

The drive arrangement 12 may comprise a connector 20 for connecting the actuator assembly 10, which might be a THSA, at the drive arrangement end of the screw shaft 14 to a frame 150. The connector 20 may be a rotatable connector (rotational coupling 20) and may be disposed on axis A of the actuator assembly 10. For example, the connector 20 may be a ball or a cup of a ball-joint mount. In the absence of the rod 100, the actuator assembly 10 may be free to pivot/rotate in all directions about this connector 20.

The gearbox of a THSA is attached to the aircraft structure. Because the actuator assembly transforms a rotation into a linear movement, any external axial load applied to the actuator generates a torque on the THSA gearbox that must be reacted by the aircraft structure.

Figure 3:
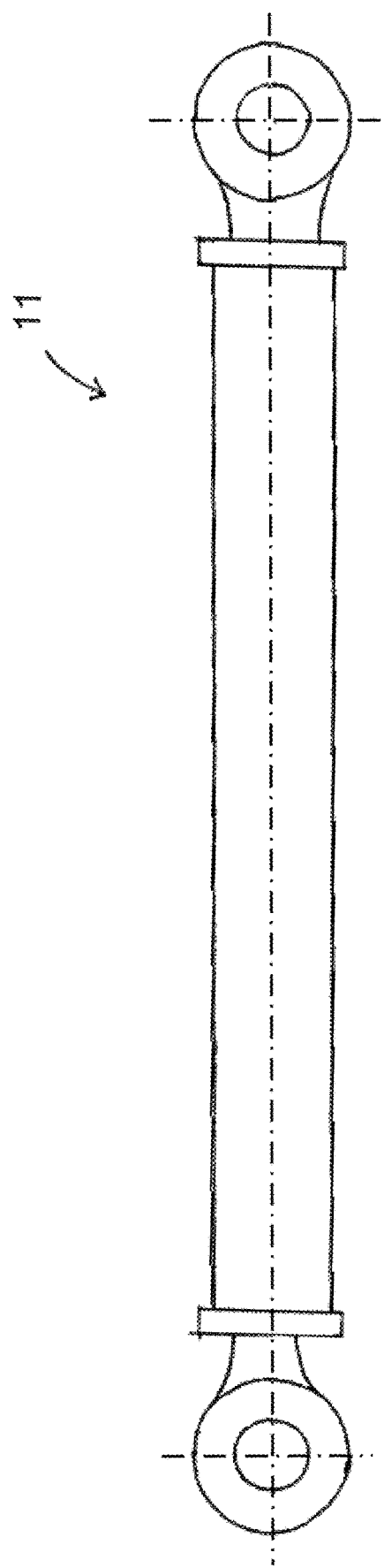
FIG. 3 shows a side view of a prior art rigid rod.

In the prior art, a rigid rod 11, e.g. as shown in FIG. 3, would have been provided as a "single lug" attachment to react torque on the drive arrangement 12 about the screw shaft axis A.

Figure 2:
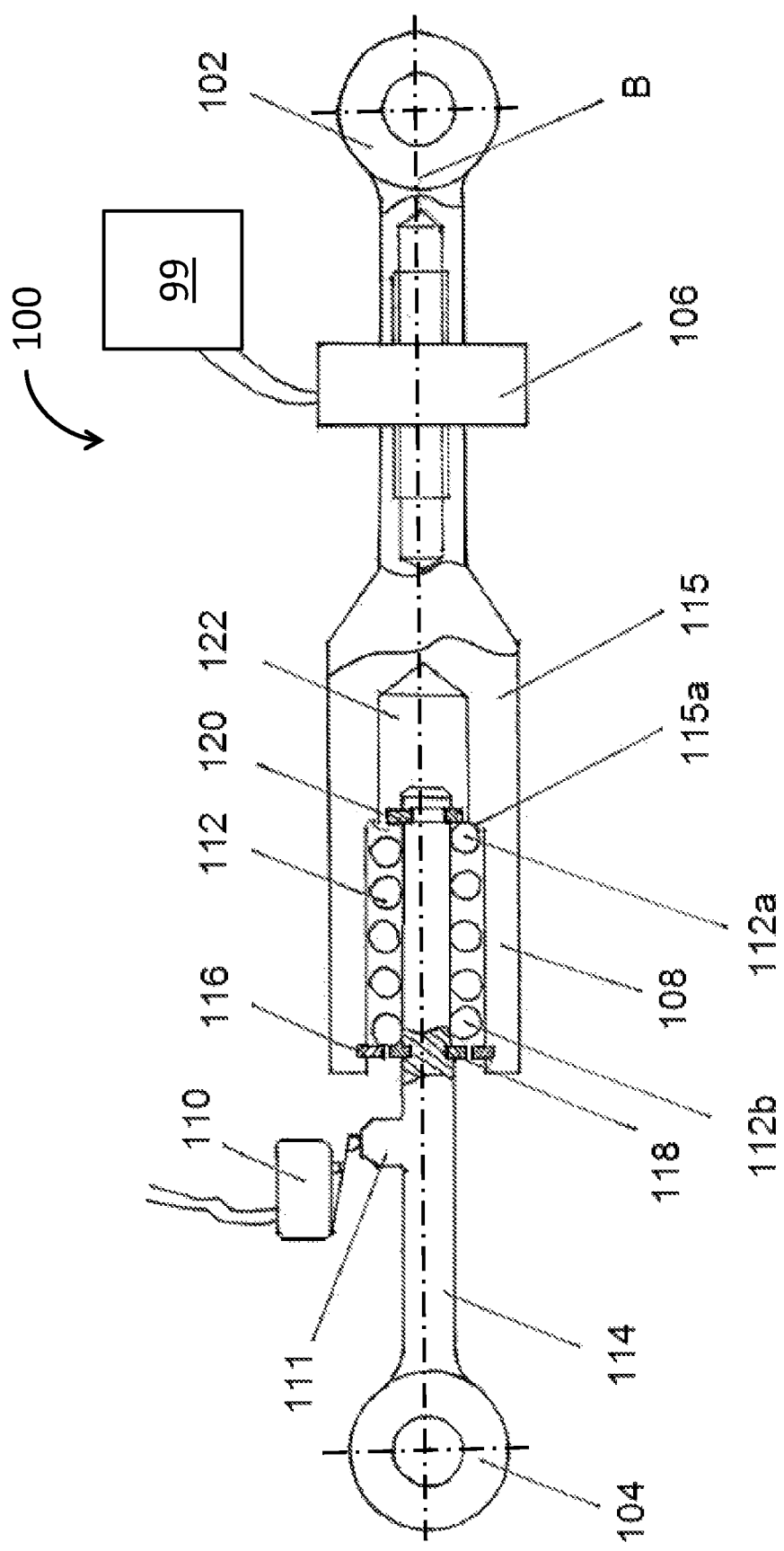
FIG. 2 shows a side view of an exemplary rod in accordance with the present disclosure.
Figure 6:
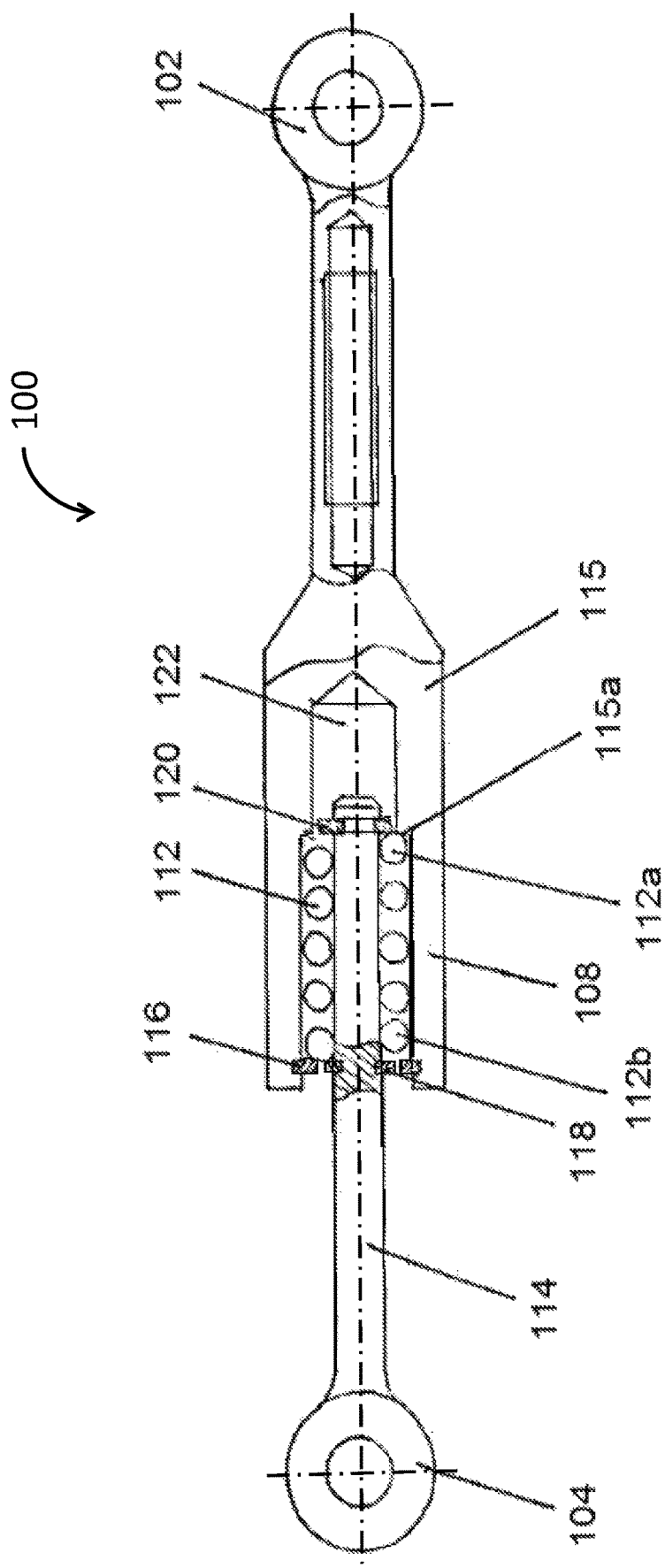
FIG. 6 shows a rod having a load limiter.

Exemplary rods 100 for use in the actuator assembly 10 of the present disclosure are shown in FIGS. 2 and 6.

The rod may have a first end 102 that connects to the drive arrangement 12 and a second end 104 connectable to a frame 150. Both connections 102, 104, may for example be clevis-type fasteners.

The rod 100 is mounted to the drive arrangement 12 at a location off the shaft axis A (i.e., spaced from the axis or skew to the axis). It has a primary function of reacting torque about the screw shaft 14, feeding the torque as a load to its point of contact on the frame 150. In so doing it provides a load path for the forces (referred to herein as the "rod load path").

In accordance with the present disclosure, the rod may comprise a device 106, 108 which provides a secondary function for the actuator assembly based on the load experienced along the rod load path. In other words the rod 100 is provided with additional functionality.

In one embodiment, the device comprises a resilient mechanism, such as a spring arrangement. The rod may comprise a spring arrangement in the form of a load limiter 108, for example as shown in a basic form in FIG. 6, or may comprise a spring arrangement in the form of a load limiter 108 together with a second device in the form of a load sensor or other device which responds to the load experienced along the rod load path to provide a secondary function for the actuator assembly.

The rod 100 may contain a device in the form of a load limiter 108. The load limiter 108 may be configured to control compression or extension of the rod 100, e.g. once a pre-load has been exceeded, either in compression or tension. In the examples shown in FIGS. 2 and 6, a first shaft 114 may be telescopically received within a second shaft 115. A spring 112, for example a coil spring, may be disposed within the second shaft 115. The first shaft 114 and the second shaft 115 may be portions of the rod 100. The load limiter 108 may serve to protect the actuator arrangement 10.

As shown in FIG. 2 (and FIG. 6), one end 112b of the spring 112 may abut a flange 116 of the second shaft 115 and a first flange 118 of the first shaft 114. The other end of spring 112 may abut a shoulder 115a of the second shaft and a second flange 120 of the first shaft 114. The distance between the shoulder 115a and the flange 116 of the second shaft 115 may determine a maximum possible length of the spring 112. The spring 112 may be chosen such that its natural length is greater than the distance between the shoulder 115a and the flange 116 of the second shaft 115. That is to say, the spring 112 may be in compression within the second shaft 115. The amount of compression from the natural length of the spring 116 may determine the pre-load on the rod 100.

When a force is applied along the axis B of rod 100 (either an extension or a compression force) then the rod 100 will act as a rigid rod if the force is less than the pre-load of the spring 112. If the force becomes greater than the pre-load, then the spring 116 may compress within the second shaft 115. As described in detail below, compression of the spring 112 can be caused by both extension of the rod 100 and by compression of the rod 100. In other words, any extension or compaction of the rod 100, once the pre-load has been exceeded, is performed against the bias of the spring 116.

In the orientation shown in FIG. 2, if the second shaft 115 is held static and the first shaft 114 is pushed to the right (i.e. the rod is compressed) by a force greater than the pre-load of the spring 116, then the first flange 118 will push against second end 112b of the spring 112 and compress it against the shoulder 115a of the second shaft 115. The second flange 120 may move into a cavity 122 in the second shaft 115. That is, the rod 100 decreases in length against the bias of the spring 112.

In the orientation shown in FIG. 2, if the second shaft 115 is held static and the first shaft 114 is pulled to the left (i.e. the rod is in tension) by a force greater than the pre-load of the spring 116, then the second flange 120 will push against the first end 112a of the spring 112 and compress it against the flange 116 of the second shaft 115. The first flange 118 may move out from the second shaft 115 to the left. That is, the rod 100 increases in length against the bias of the spring 112.

The effect of this may be to provide the rod load path with some resiliency in order to absorb the impulse of loads which exceed a threshold level set by the spring pre-load— the load limiter 108 activates to limit axial forces in the rod. This can be seen schematically by the representation in FIG. 5. Thus, the load limiter 108 (or other resilient mechanism) can be used to provide a shock absorbing function for the actuator assembly and thereby protect the actuator assembly 10 from sudden changes in torque on the drive arrangement.

The actuator assembly 10 may have an end stop 18 (see FIG. 1) for preventing the nut 16 from moving off an end of the screw shaft 14. There may be an end stop 18 provided at either end of the range of motion of the nut 16 along the screw shaft 14. The actuator assembly 10 may use information from a sensor to determine the position of the nut 16 on the screw shaft 14. However, if there are errors in the setup, such as miscalibration of the sensor or more usually runaway, then it is possible for the nut 16 to be driven into the end stop 18 at speed.

In such situations in prior art devices, to prevent damage to the nut or the end stop, the end stop typically would be constructed of a relatively soft material, such as an elastic or polymer based material, to absorb impact from the nut, i.e., to provide a shock absorber. Such materials may be prone to ageing and damage from repeated stop cycles.

In the present actuator assembly 10, the end stop 18 may be made of a rigid material, for example, a metal, such as steel or aluminium, which may have greater longevity. It may reduce the servicing commitments that would otherwise be required.

There may be two end stops disposed on the screw shaft. One may be disposed at an end distant from the drive arrangement 12 and the other end stop 18 at an end near the drive arrangement 12. The two end stops 18 may define a total range of motion of the nut 18 along the screw shaft 14. If the nut 16 impacts an end stop 18, then substantial torque may be introduced into the screw shaft 14. In the manner described above, this torque may be reacted into the rod 100 and absorbed by the load limiter 108.

If the force along the load path in the axial direction of the rod 100 generated from reacting the torque is greater than the pre-load of the load limiter 108, then the load limiter 108 may activate and absorb that force over a distance of compression of the spring 112 in the load limiter 108. Taking up the force with a spring 112 extending over a distance can limit the average impulse experienced by the rod 100 when the nut 16 impacts the end stop 18. Thus, the rod 100 can absorb the forces from this impact and this may reduce the forces generated in other parts of the system, such as gears in the drive arrangement 12, the nut 16, the screw shaft 14, the end stop(s) 18, the housing 12 etc. This may protect the actuator assembly 10 from damage.

If end stops 18 are disposed at either end of the limit of travel of the nut 16, then impact of the nut on one end stop may produce clockwise torque in the drive arrangement 12 while impact of the nut on the other end stop 18 may produce anticlockwise torque on the end stop. As the load limiter 108 may be configured to absorb impacts via either compression or extension of the rod 100, the actuator arrangement 10 can be protected regardless of which end stop 108 is impacted.

The device 106, 108 may be provided as part of the rod 100 for detecting a performance of the actuator assembly based on load experienced along the rod load path reacting torque on the drive arrangement 12.

The performance may be an event in time during the use of the actuator assembly, for example a hard stop as the nut 16 reaches an end stop 18 abruptly, or it may be an operational characteristic over time, for example a deterioration of the no-back function or other malfunction in the drive arrangement 12 or driven component.

In one embodiment, the rod 100 may comprise a device in the form of a load limiter 108 as shown in FIG. 2. To detect activation of the load limiter 108, a switch 110 may be disposed adjacent a target 111 such as a flange or other radial projection of the first shaft 114. If the axial load on the rod 100 is greater than the pre-load of the load limiter 108 then the load limiter 108 will activate. That is to say, the first shaft 114 may move relative to the switch 110. If the target 111 moves away from the switch (i.e. to the right or to the left in FIG. 2), then the switch 110 may activate and send a signal indicating that the load-limiter 108 has been activated.

In an alternative example, the switch 110 may be a LVDT or other distance sensor mounted to one of the first shaft 114 or second shaft 115 and configured to monitor a distance between the two shafts to detect activation of the load-limiter (i.e. axial load on the rod 100 above the pre-load).

The extension or compaction of the rod 100 in response to load along the rod load path may be a linear function once the pre-load value of the load limiter has been exceeded. Accordingly a distance sensor sensing the change in length of the rod 100 may be used to calculate the load at a given moment and provide an indication of the torque experienced by the drive arrangement 12 about the screw shaft 14.

Moreover the activation of a load limiter 108 can be used to detect end stroke stop engagement by setting "normal" and "abnormal" load ranges, e.g., through setting the pre-load. Any torque reaction rod load outside a "normal" range can then be taken as an indication of an end stroke stop engagement.

Thus, in accordance with particular embodiments, the rod 100 may have a device 106, 108 for detecting a performance of the actuator assembly 10.

In one embodiment, the rod 100 may have a device to assist with monitoring the health of the actuator assembly, for example, in the form of a load sensor 106.

Various designs of electrical motor can operate either as a motor or as a generator, depending on whether electrical power is being supplied to the motor contacts to turn it or whether an external torque is forcing the motor parts to turn with respect to one another and through that generate electricity. In addition, various designs of hydraulic motor, e.g., where a fluid is being used to rotate a turbine about a shaft, can operate as a motor when the fluid is being forced under pressure into the turbine, or it can act as a pump (or a brake) when an external force causes rotation of the turbine shaft, forcing fluid around a hydraulic circuit. Further, many designs of motors can usually rotate their output shaft in both clockwise and anticlockwise directions.

Figure 4:
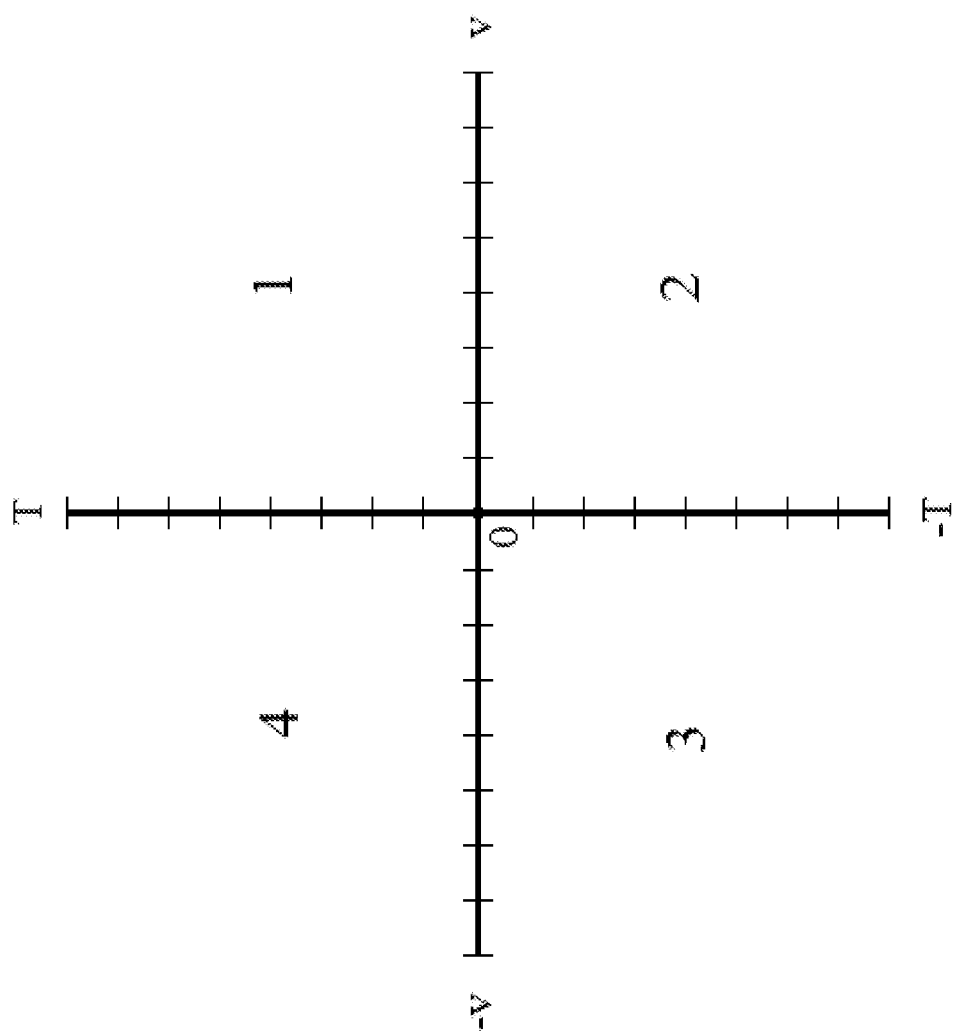
FIG. 4 shows a graphical representation of motor torque against rotation of the screw shaft.

These quadrants of a motor may be graphically represented as shown in FIG. 4.

In FIG. 4, in the first quadrant 1, the torque that the motor is applying to the output shaft (which may, for example, be a drive shaft or may be a screw shaft) is, for example, in the clockwise direction and designated T (positive value) and the rotation of the shaft is in the clockwise direction (designated positive v). In the third quadrant 3, the torque that the motor is applying to the output shaft is, in this example, in the anticlockwise direction and designated −T (negative value) and the actual rotation of the shaft is in the anticlockwise direction (designated −v). In both of these quadrants, 1 and 3 (resistive load quadrants), the motor is acting as a motor and is driving the shaft (i.e., power is being supplied to the motor inputs resulting in turning of the motor shaft in the desired direction). The parts being driven are providing the resistive load.

In the second quadrant 2, the torque that the motor is applying to the output shaft is in the clockwise direction but the actual rotation of the shaft is now in the anticlockwise direction. This occurs if anticlockwise forces applied to the output shaft from outside the motor are greater than those clockwise forces being applied by the motor. In this quadrant (load driven quadrant), the motor may act as a brake to the anticlockwise forces.

For example, if the motor is an electric motor, then the external forces may be converted into electricity. Alternatively, if the motor is a hydraulic motor, then the output pressure of the motor will be higher than the input pressure.

Similar to the second quadrant 2, in the fourth quadrant 4, the torque that the motor is applying to the output shaft is in the anticlockwise direction but the actual rotation of the shaft is now in the clockwise direction. In quadrant 4 the motor provides a load which is being driven.

With regard now to the present disclosure, a load sensor 106 may be disposed on the rod 100 to detect at least a direction of load on the rod 100. The load sensor 106 may be arranged to detect a direction of load along the longitudinal axis B of the rod 100. The load sensor 106 may optionally detect a magnitude of the load along the rod 100. The drive arrangement 12 (motor/gearbox) may be supported on the screw shaft 14 in a way which allows the drive arrangement 12 to "float" about the axis A of the screw shaft 14, for example by mounting the housing of the drive arrangement 12 on bearings on the screw shaft 14 and/or no-back device 22. In this way, feedback torque on the no-back device 22 may be independent of the feedback torque on the housing of the drive arrangement 12.

A movement sensor 24 may be provided to sense rotation of the screw shaft 14 relative to the drive arrangement 12. The movement sensor 24 may be any type of sensor capable of directly or indirectly sensing at least a direction of rotation of the motor/screw shaft. It may sense the rotation directly or indirectly. For example, it could be a rotation sensor measuring rotation of the screw shaft 14, or it could be a sensor sensing rotation of a drive shaft or other part of the motor driving the screw shaft 14, a rotary component of the gearbox, or a sensor sensing the movement of the nut or other connected component. It may be a motor speed sensor, particularly an existing motor speed sensor. The movement sensor 24 may be installed on the actuator assembly 10 or may be installed between fixed and movable surfaces of an aircraft.

In one example, the movement sensor 24 could be a rotary encoder. The sensor 24 may sense at least a direction of rotation of the screw shaft 14. The movement sensor 24 may also sense a speed of rotation of the screw shaft 14.

As described in more detail below, knowing both the direction of the load on the rod 100 and movement information indicating at least a direction of rotation of the screw shaft 14, may be used to calculate which quadrant the drive arrangement 12 is being operated in. Operation in either of the two resistive load quadrants may indicate that the no-back device is working correctly, while operation in a load driven quadrant may indicate a dysfunction such as wear or failure of the no-back device 14.

Additional information from the magnitudes may be used to understand more fully the operation of the drive arrangement 12. For example, the relative excursion of the drive arrangement into a load driven quadrant or relative time spent in such a quadrant may indicate the state of the components and likelihood of failure, particularly failure of the no-back device 22.

When the motor decelerates as it stops rotating the screw shaft 14 once the nut 16 has reached a desired position, the measured torque (as determined by the rod 100) may briefly change direction while the rotation of the screw shaft 14 slows (but does not reverse). Thus, the motor may briefly enter the second or fourth quadrants even though the no-back device 14 is still functioning properly. To avoid an erroneous determination of wear or failure of the no-back device 14, the system performing the determination (e.g. a processor) may record data regarding the number of occasions and/or a duration of the occasions in which the motor is acting in the second or fourth quadrants. In one example, the system may disregard brief periods (e.g. 100 ms) when the motor is operating in the resistive load quadrants, and only output an alarm or error message if the motor continues to act in a resistive load quadrant beyond the brief period. Detection may also be activated only during steady state operation using a derivation-of-position sensor signal or direct speed sensor information to detect steady state operation.

Alternatively or additionally, the data may also be compared to an expected deceleration of the motor. From this data, the system may, for example, output a wear/failure signal only after a succession of periods in which the motor is acting in the second or fourth quadrants and/or after a particular duration in which the motor is acting in the second or fourth quadrants and/or when the motor is unexpectedly acting in the second or fourth quadrants (i.e. when deceleration of the actuator assembly 10 is not expected).

Thus, in this way, the rod 100 may provide a secondary function of feeding back information which can be used in a monitoring system to assess the operation and/or health of the actuator assembly 10, adding functionality to the actuator assembly 10.

The rod 100 comprising the device for providing the primary and secondary functions may be retrofitted onto an existing actuator assembly, to increase the functionality of such an actuator assembly.

The rod 100 may comprise one type of device 106, 108 or may comprise two or more devices providing additional functionality responsive to load in the rod load path beyond the rod's primary function of reacting torque on the drive arrangement 12.

Figure 7:
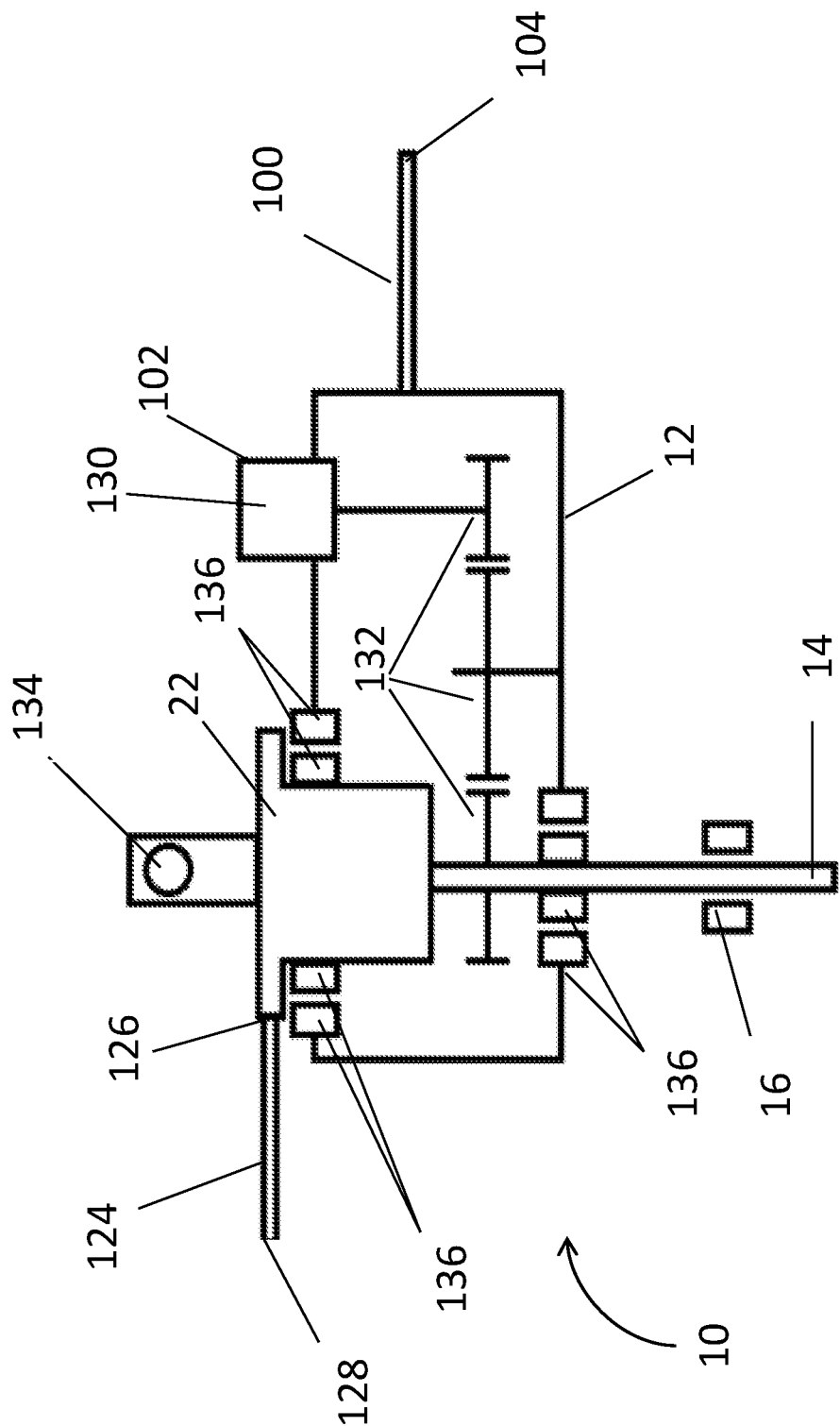
FIG. 7 shows a schematic view of an exemplary screw actuator assembly comprising a second rod and a motor/gearbox 'floating' about a no-back housing to prevent reaction of any torque between the two housings and allow separate monitoring of the reaction torque on the no-back housing and on the motor/gearbox.

FIG. 7 shows a schematic side elevation of a further exemplary screw actuator assembly comprising a second torque reaction rod 124 which reacts torque on the no-back device 22 into the frame (aircraft structure). The screw shaft 14, nut 16, drive arrangement 12, no-back device 22 and rod 100 may be the same as for the screw actuator assembly of FIG. 1 and so will not be described in further detail here (like reference numerals have been used for corresponding structural features). The screw actuator assembly 10 may also comprise end stops 18 (not shown) similar to FIG. 1.

The actuator assembly 10 comprises a second rod 124 which has a first end 126 that connects to the no-back device and a second end 128 that is connectable to a frame 150. Both connections 126, 128 may for example be clevis-type fasteners.

The second rod 124 is mounted to the no-back device 22 at a location off the shaft axis A (i.e. spaced from or skew with the axis). It has a primary function of reacting torque about the screw shaft 14, feeding the torque on the no-back device 22 as a load to a point of contact on the frame. In so doing, it provides a load path in the same way as the first rod 100 and the torque from the drive arrangement 12.

The motor 130 may drive the screw shaft 14 via gears 132 of a gearbox, for example, which might be in the form an epicyclic gearbox. The no-back device 22 may be provided at one end of the screw shaft 14 to provide reaction torque, and secured to a frame via a gimbal or clevis type connection 134 which permits rotation of the actuator assembly about axis A. The drive arrangement 12 may be supported on a housing of the no-back device 22 and/or to the screw shaft 14 through an arrangement of bearings 136 that allow the drive arrangement 12 to "float" about the screw shaft axis A and the no-back device 22. The bearings 136 may comprise, for example, plain, ball, roller, or thrust type bearings.

While not shown in such detail, a similar drive arrangement 12 may be provided in the actuator assembly 10 of FIG. 1.

The "floating" arrangement prevents reaction of any torque between the two housings. This allows separate monitoring of the reaction torque on the no-back housing and on the motor/gearbox housing.

As with the first rod 100, the second rod 124 may comprise a device 106, 108, similar to the first rod 100 which provides a secondary function for the actuator assembly based on the load experienced along the second rod 124.

Thus, in one embodiment, the second rod 124 may comprise a device in the form of a load limiter 108, e.g., as shown in FIG. 2. The operation of the load limiter would be the same as described above in connection with the first rod 100. However, due to its relative position and the inertia of the no-back device compared to the motor/gearbox, the benefits of providing a load limiter 108 here are less than for the first rod 100, though may provide benefits nevertheless. Optional features such as a switch to detect activation of the load limiter 108 on the second rod 124 may be provided.

In another embodiment, the second rod 124 may have a device to assist with monitoring the health of the actuator assembly, for example, in the form of a load sensor 106, similar to the first rod 100, e.g., to assist with the monitoring function. In the actuator assembly 10, to help facilitate the no-back monitoring function, the drive arrangement 12 (e.g., the housing containing the gears and the motor(s)) may be able to 'float' or rotate around the no-back housing. The torque on the no-back device 22 may then be reacted independently of the torque on the motor/gearbox housing 12. The torque may be reacted into the aircraft structure. Load sensors 106 provided on the first and second rods 100, 124 may detect at least a direction of load on the two rods 100, 124 and feed the information back to a processor to determine the health of the actuator assembly 10. The processor may be part of the motor/gearbox assembly of the drive arrangement 12 or may be an aircraft flight control computer or aircraft maintenance computer. The load sensors 106 may further each output a signal indicative of the magnitude of the load.

The sum of the two load sensor signals represents a total reaction torque to the aircraft structure. It is equal to the torque on the nut and therefore can provide an accurate image of the external load on the actuator assembly (e.g., THSA) in a steady state condition (no inertial load). These load sensor signals may be used to compute parameters such as a fatigue or endurance life consumption of the actuator assembly 10.

The load sensor signals can also be used to monitor more accurately the operation of the no-back device 22, as the braking torque is generally proportional to the axial load on the actuator assembly 10 within a range corresponding to variations of coefficient of friction. By comparing reaction torque on the no-back device 22 with the total reaction torque, it can be confirmed whether the braking torque provided by the no-back device 22 is within an acceptable range (without requiring motor current).

The load sensors 106 may output signals to a processor which is programmed with one or more algorithms to compute certain parameters. In this way, the actuator assembly 10 may be provided with additional functionality, e.g., provided with the ability to monitor the operation of the no-back device 22 and/or compute consumed actuator life based on load values detected by load sensor(s) 106 on the first/second rods 100, 124. The processor may be associated with a storage device to record the load values for later analysis.

Figure 8:
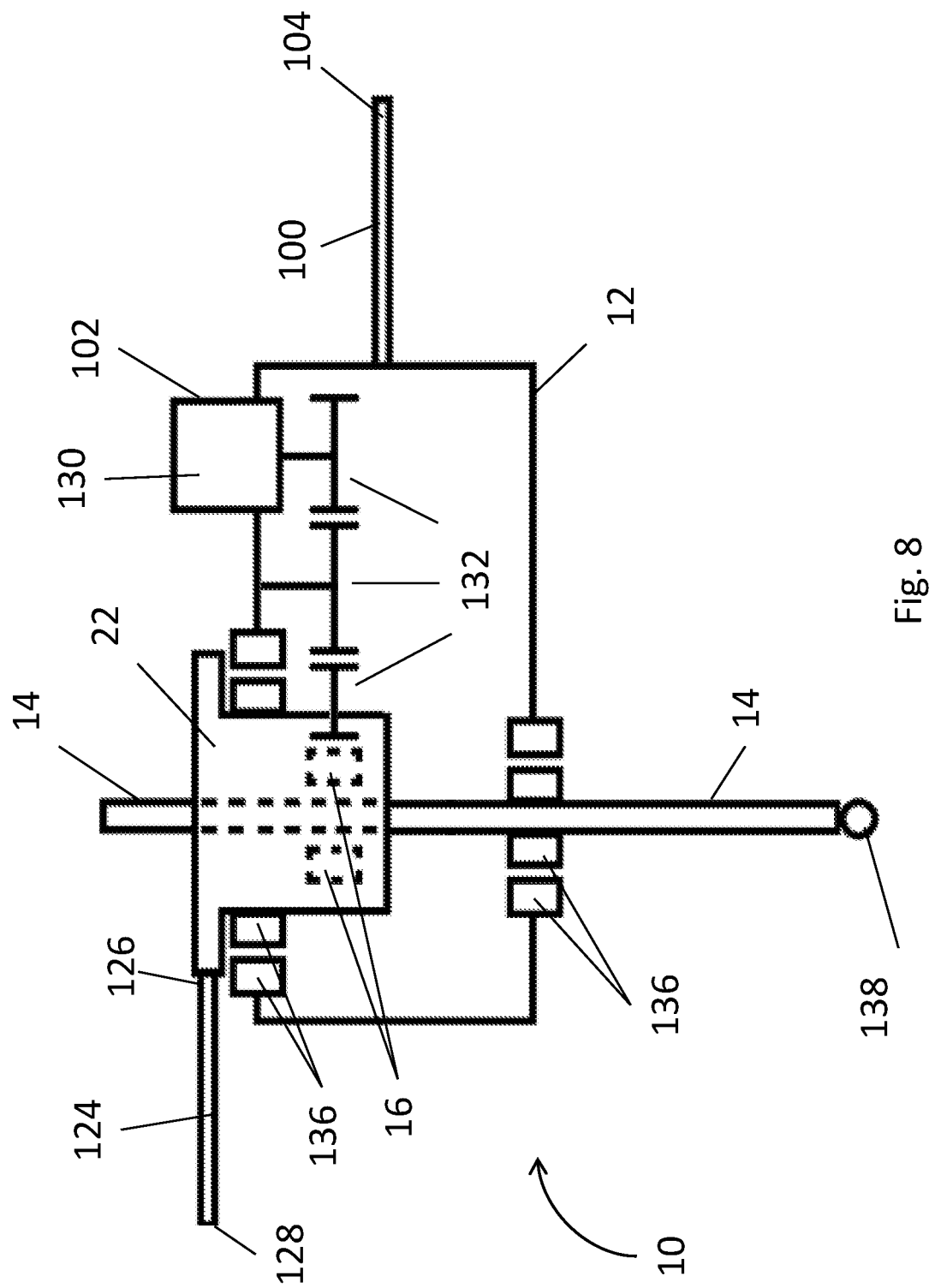
FIG. 8 shows a schematic view of an exemplary screw actuator assembly comprising a similar set-up to the screw actuator assembly of FIG. 7 but where the nut is provided as part of the no-back device and the screw shaft translates with respect to the no-back device to actuate a flight control surface.

FIG. 8 shows a further exemplary embodiment of the screw actuator assembly where the nut 16 is provided as part of the no-back device 22. In the FIGS. 1 and 7 embodiments, the nut 16 is coupled to a moveable flight control surface (not shown) and translates along the screw shaft 14. In the FIG. 8 embodiment, the nut 16 remains positionally fixed in the axial direction with respect to the aircraft structure and the screw shaft 14 translates within the nut 16 so as to move a coupling 138 at one end of the screw shaft 14, which in turn can move a flight control surface. Such screw shaft/nut arrangements may be seen in certain flap actuators. The other features of FIG. 8 (e.g., the first and second rods 100, 124, the "floating" motor/gearbox arrangement, end stops 18 etc.) correspond to those already described in FIG. 7 and so for the sake of simplicity will not be described further herein.

Thus, viewed from another aspect, the present disclosure may be seen to provide an actuator assembly comprising: a screw shaft rotatable about a shaft axis or translatable along a shaft axis; a drive arrangement supported about the screw shaft axis for driving the screw shaft about the shaft axis or along the shaft axis; a no-back device; and at least one rod mounted at one end to the drive arrangement and/or to the no-back device, and at the other end to a frame to transmit load to the frame and provide a torque reaction function for the drive arrangement/no-back device, wherein the at least one rod is provided with a load sensor which is arranged to transmit load signals to a processor, and wherein the processor is programmed with an algorithm to determine a parameter indicative of an operational characteristic of the no-back device based on the load signals.

The actuator assembly of this aspect may comprise any of the optional features mentioned above in connection with the other aspects.

The actuator assembly, via the algorithm, may be configured to compute a parameter indicative of braking torque provided by the no-back device during use.

Additionally or alternatively, the actuator assembly may be configured, via the algorithm, to compute a parameter indicative of consumed actuator life based on loads detected via the load sensor and an amount of motion associated with this load.

The algorithm may be used to calculate consumed endurance, or remaining endurance. The algorithm may be used to calculate, in addition to or alternatively, a fatigue life potential for the actuator assembly or part thereof.

The load values may be used to provide immediate feedback, e.g., to a pilot, and/or the load values may be stored for later analysis. For example, the load values or calculated parameters may be sent to aircraft maintenance computers by the actuator assembly's control electronic, e.g., via a digital bus (such as ARINC, AFDX, etc.).

Viewed from a further aspect, the present disclosure can be seen to provide a method of monitoring an operational characteristic of a no-back device of an actuator assembly, the actuator assembly comprising a screw shaft having a shaft axis, a drive arrangement pivotally supported about the screw shaft axis for driving the screw shaft, and a no-back device for countering feedback torque, wherein at least one rod is mounted at one end to the drive arrangement or to the no-back device, and at the other end to a frame to transmit load to the frame and provide a torque reaction function for the drive arrangement/no-back device, the at least one rod having a load sensor which is arranged to transmit load signals to a processor 99 programmed with an algorithm, and wherein the processor 99 determines a parameter indicative of an operational characteristic of the no-back device based on the load signals it receives from the load sensor(s).

The method of monitoring of this aspect may comprise any of the optional features mentioned above in connection with the other aspects.

The method of monitoring may comprise, via the algorithm, computing a parameter indicative of braking torque provided by the no-back device during use.

Additionally or alternatively, the method of monitoring may comprise computing a parameter indicative of consumed actuator life based on loads detected via the load sensor and an amount of motion associated with this load.

Using an algorithm, the processor 99 may calculate consumed endurance, or remaining endurance. An algorithm may be used to calculate, in addition to or alternatively, a fatigue life potential for the actuator assembly or part thereof.

The method of monitoring may use the load values to provide immediate feedback, e.g., to a pilot, and/or load values may be stored for later analysis. For example, the load values or calculated parameters may be sent to aircraft maintenance computers by the actuator assembly's control electronic, e.g., via a digital bus (such as ARINC, AFDX, etc.).

As indicated herein, the actuator assembly may be a flight control actuator, in particular it might be a THSA for an aircraft. Thus, as has been described, the actuator assembly, at least in certain embodiments, may be seen to provide one or more of the following benefits: a continuous health monitoring status, e.g., of a THSA no-back device by comparing the gearbox reaction torque with at least the direction of motor(s) rotation; an end-stroke stop engagement detection function; and/or an elastic function required to absorb the end-stroke stop kinetic energy.

Figure 9B:
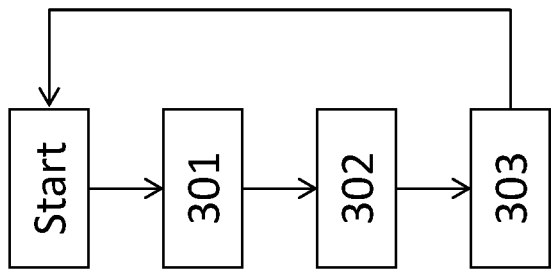
FIGS. 9A and 9B show flow diagrams indicating steps performed by the processor upon receipt of a signal from a sensor on the rod.
Figure 9A:
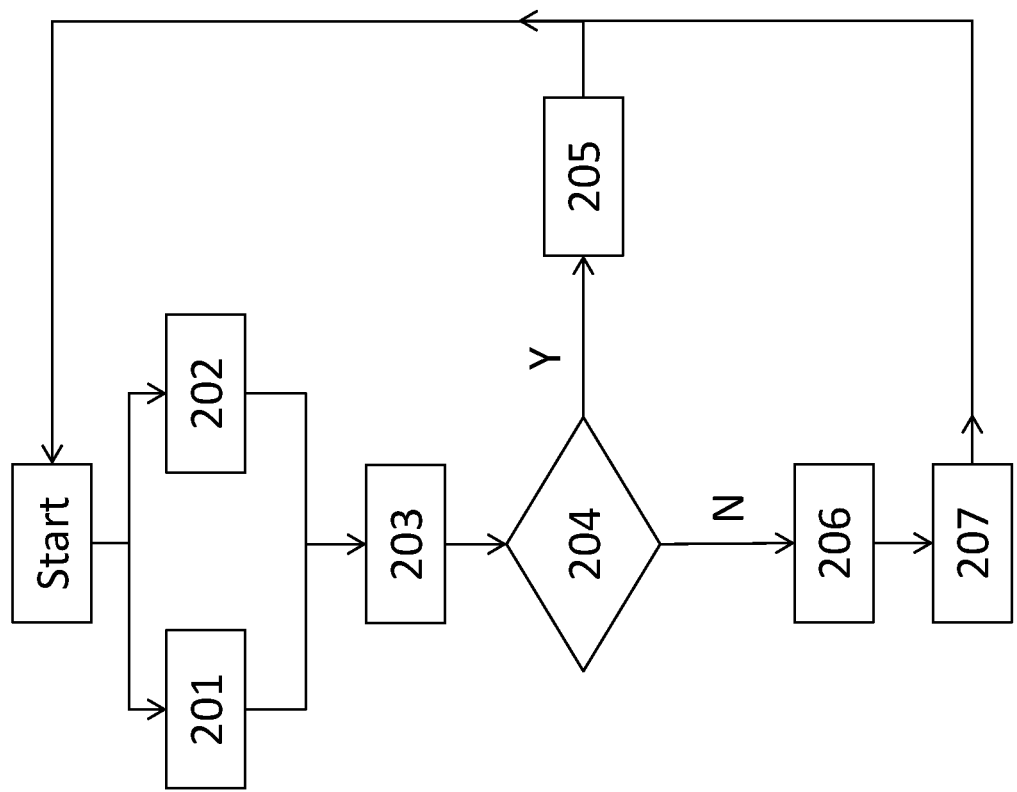

FIG. 9A shows a flow diagram indicating steps related to the processor 99 receiving a signal from the rod, processing the signal, and outputting a signal indicative of the results of the processing. The steps shown in the flow chart of FIG. 9A are as follows:

Step 201: Receive a signal from the load sensor indicating a direction (and optionally, a magnitude) of load along the rod load path.

Step 202: Receive a signal indicating a direction of drive being applied to the screw shaft.

Step 203: Compare the signals using the processor.

Step 204: Does the comparing of the signals indicate the direction (and optionally, magnitude) of the torque on the rod is different from the direction of drive being applied to the screw shaft?

Step 205: Determine the motor is acting in a load-driven quadrant

Step 206: Determine the motor is acting in a resistive quadrant

Step 207: Output a signal indicating the motor is acting in a resistive quadrant.

FIG. 9B shows another flow diagram indicating another set of steps related to the processor 99. The steps of FIG. 9B include:

Step 301: Receive a signal indicating a magnitude of the load along the rod.

Step 302: Calculate a fatigue life consumption and/or endurance life consumption.

Step 303: Output a signal indicating fatigue life consumption and/or endurance life consumption.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. An actuator assembly comprising:
   a screw shaft having a shaft axis;
   a drive arrangement pivotally supported for rotation around the shaft axis for driving the screw shaft;
   a rod mounted to the drive arrangement at a location radial outward from the shaft axis for providing a primary function of reacting against torque applied about the shaft axis on the drive arrangement, the rod having a rod axis and being arranged to provide a load path that experiences load in a direction along the rod axis in reaction to torque on the drive arrangement, wherein the rod comprises a load sensor for detecting at least a direction of the load along the rod load path;

a no-back device, wherein the no-back device is connected with a rotational coupling to a frame and the drive arrangement is supported on bearings permitting the drive arrangement to rotate about the screw shaft axis and about the no-back device; and a processor configured to receive a movement signal indicating a direction of drive of the screw shaft from a movement sensor and to receive a direction of load signal from the load sensor, wherein the processor is configured to determine, from the direction of load signal and the movement signal, whether or not the drive arrangement is operating in a resistive load quadrant or a load driven quadrant.

2. The actuator assembly as claimed in claim 1, wherein the device comprises a resilient mechanism.

3. The actuator assembly as claimed in claim 2, wherein the device comprises a load limiter which activates to limit axial forces in the rod.

4. The actuator assembly as claimed in claim 2, wherein the resilient mechanism is a spring arrangement.

5. The actuator assembly as claimed in claim 3, wherein relative movement of a nut along the screw shaft is limited by at least one metal end stop.

6. The actuator assembly as claimed in claim 1, wherein the device is for detecting a performance of the actuator assembly based on load experienced along the rod load path reacting torque on the drive arrangement, wherein the device comprises a load limiter configured to control a change in length of the rod through axial movement of one portion relative to another when a load along the rod load path exceeds a pre-load of the load limiter, and wherein the device comprises an activation sensor for detecting a change of length of the rod.

7. The actuator as claimed in claim 1, wherein the load sensor is arranged to transmit load signals to a processor which is programmed with an algorithm to compute parameters comprising a fatigue life consumption or endurance life consumption of one or more components of the actuator assembly.

8. The actuator assembly as claimed in claim 1, wherein the processor is configured to:
   output a performance signal indicating whether the drive arrangement is operating in a resistive load quadrant or a load driven quadrant.

9. The actuator assembly as claimed in claim 1, wherein the actuator assembly further comprises a second rod for reacting against torque applied to the no-back device into the frame, the second rod being provided with a device which provides a secondary function for the actuator assembly based on load experienced along the second rod.

10. The actuator assembly as claimed in claim 9, wherein the device in the second rod is a load sensor which provides a load signal for use in monitoring the operation and/or health of the actuator assembly.

* * * * *